United States Patent
Sjölinder et al.

(10) Patent No.: US 9,445,348 B2
(45) Date of Patent: Sep. 13, 2016

(54) DELIVERY OF INTERNET BASED SERVICE TO USER EQUIPMENT

(75) Inventors: Sven Sjölinder, Stockholm (SE); Walter Müller, Upplands Väsby (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 306 days.

(21) Appl. No.: 14/009,734

(22) PCT Filed: Apr. 6, 2011

(86) PCT No.: PCT/SE2011/050412
§ 371 (c)(1), (2), (4) Date: Oct. 3, 2013

(87) PCT Pub. No.: WO2012/138269
PCT Pub. Date: Oct. 11, 2012

(65) Prior Publication Data
US 2014/0023044 A1    Jan. 23, 2014

(51) Int. Cl.
*H04W 40/24* (2009.01)
*H04W 48/08* (2009.01)
(Continued)

(52) U.S. Cl.
CPC ........ *H04W 40/248* (2013.01); *H04L 67/1095* (2013.01); *H04L 67/2814* (2013.01); *H04W 36/0033* (2013.01); *H04W 12/08* (2013.01); *H04W 76/022* (2013.01)

(58) Field of Classification Search
CPC ........... H04L 29/06829; H04L 63/101; H04L 67/1095; H04L 2029/06054; H04W 40/248
See application file for complete search history.

(56) References Cited

U.S. PATENT DOCUMENTS 6,519,647 B1 * 2/2003 Howard ................ H04L 63/101
709/203
8,478,331 B1 * 7/2013 Rogers ................ H04W 28/065
455/3.01

(Continued)

FOREIGN PATENT DOCUMENTS

| EP | 1427225 A2 | 6/2004 |
| EP | 2159983 A1 | 3/2010 |
| EP | 2237530 A1 | 10/2010 |

OTHER PUBLICATIONS

3rd Generation Partnership Project. "3GPP TR 23.829 V10.0.0 (Mar. 2011)," 3rd Generation Partnership Project; Technical Specification Group Services and System Aspects; Local IP Access and Selected IP Traffic Offload (LIPA-SIPTO) (Release 10). Mar. 29, 2011. pp. 1-44.

*Primary Examiner* — Scott M Sciacca
(74) *Attorney, Agent, or Firm* — Patents on Demand P.A.; Brian K. Buchheit; Scott M. Garrett

(57) ABSTRACT

A base station (510), a local server (520), a user equipment (500) and Internet server (540) of a wireless communication network and respective methods therein are provided for enabling provision of an Internet based service to a user equipment, the base station being associated with the local server, which is capable of delivering the Internet based service. A user equipment requesting an Internet based service is requested by the Internet server to discover if the base station is associated with a local server capable of providing the Internet based service to the user equipment. If the user equipment discovers a local server, associated with the base station, capable of providing the Internet based service, the user equipment requests the Internet based service from the local server, via the base station.

12 Claims, 11 Drawing Sheets

(51) Int. Cl.
   *H04W 36/00*   (2009.01)
   *H04L 29/08*   (2006.01)
   *H04W 12/08*   (2009.01)
   *H04W 76/02*   (2009.01)

(56) References Cited

U.S. PATENT DOCUMENTS

| | | | |
|---|---|---|---|
| 2004/0110484 A1* | 6/2004 | Koshino | H04W 88/14 455/403 |
| 2006/0218296 A1 | 9/2006 | Sumner | |
| 2009/0005020 A1* | 1/2009 | McGowan | H04L 65/4084 455/414.3 |
| 2010/0075635 A1* | 3/2010 | Lim | H04W 4/08 455/411 |
| 2010/0195635 A1* | 8/2010 | Maeda | H04W 8/26 370/338 |
| 2011/0038326 A1* | 2/2011 | Davies | H04W 8/26 370/329 |
| 2011/0083169 A1* | 4/2011 | Moeller | H04L 63/0853 726/5 |
| 2011/0176536 A1* | 7/2011 | De Franca Lima | H04W 76/026 370/352 |
| 2011/0188407 A1* | 8/2011 | Aboughanaima | H04L 29/12066 370/254 |
| 2013/0185410 A1* | 7/2013 | Thyni | H04L 29/12358 709/223 |

* cited by examiner

DELIVERY OF INTERNET BASED SERVICE TO USER EQUIPMENT

TECHNICAL FIELD

Embodiments herein relate generally to delivering an Internet base service to a user equipment, in particular to delivering an Internet based service to a user equipment from a local server associated with a base station.

BACKGROUND

Today's wireless communication networks are more and more utilized for data communication. The mobile phones have become more evolved being capable of supporting a wide range of services, such as for example Internet based services. The mobile phones supporting a wide range of services are often referred to as smart phones. Also, the use of laptops and Personal Digital Assistants, PDAs, in today's wireless communication networks is common in order to access different Internet based services.

Typically, when an Internet based service is delivered from an Internet server to a user equipment, laptop or the like, a connection or communication is established within the wireless communication network from the user equipment via a base station, a switching centre towards a packet gateway. The packet gateway is a gateway between the wireless communication network and the Internet. From the packet gateway, a connection or communication of some kind is established to the internet server providing the Internet based service.

Different parts of this connection are associated with different costs. Typically, the connection or communication between the packet gateway and the base station is the most expensive part of the total connection or communication between the user equipment and the Internet server. Further, the operator of the wireless communication network is in full control of the resources of his/her own wireless communication network but has no control of the resources in the internet. This may lead to considerable expenses for the operator for the connection or communication between the user equipment and the Internet server.

In addition to the cost or expenses, the download resulting from the delivery of the Internet based service may hold a large volume of data. This may lead to an overload of the connection between the user equipment and the Internet server. Again, a large volume of data will result in considerable expenses for the operator for the connection or communication between the user equipment and the Internet server, especially for the part between the base station(s) and the packet gateway.

A solution to this problem is to provide the base stations with cashes. However, this creates a new problem with the mobility of the user equipments with regards to handover from a source base station and a target base station.

SUMMARY

It is an object of the exemplifying embodiments to address at least some of the problems outlined above. In particular, it is an object of the exemplifying embodiments to minimize the traffic from base stations to a packet gateway in a wireless communication network. A further object is to minimize the traffic from the packet gateway of the wireless communication network to an Internet server. Still an object is to enable a user equipment to move about and perform a handover from a source base station to a target base station. These objects and others may be obtained by providing a base station, a local server, a user equipment and an Internet server and a method in a base station, a local server, a user equipment and an Internet server according to the independent claims attached below.

According to an aspect a method in a base station of a wireless communication network for enabling provision of an Internet based service to a user equipment is provided. The base station is associated with a local server capable of delivering the Internet based service. The method comprises receiving, from the user equipment, information identifying the user equipment and updating a connection list in the base station by adding the information identifying the user equipment. The method further comprises receiving, from the user equipment, a query for information identifying the local server and sending, to the user equipment, a confirmation response comprising a global IP address of the local server. Still further, the method comprises receiving, from the user equipment, a request for the Internet based service, the request comprising the global IP address of the local server; and mirroring the connection list from the base station to the local server. The method also comprises forwarding the request for the Internet based service to the local server for enabling the local server to deliver the Internet based service to the user equipment.

According to an aspect, a method in a local server having a global IP address and being associated with a base station is provided. The local server is capable of delivering an Internet based service to a user equipment. The method comprises receiving a request for an Internet based service from the user equipment via the base station and receiving a connection list being mirrored from the base station to the local server. The method also comprises comparing an information identifying the user equipment to information in the connection list, and delivering the Internet based service to the user equipment via the base station in the event the information identifying the user equipment is included in the connection list.

According to still an aspect, a user equipment in a wireless communication network is provided. The method comprises sending, to a base station, information identifying the user equipment; and sending, to an Internet server, an information request for Internet based service. The method further comprises receiving, from the Internet server, a query for information identifying a local server associated with the base station and capable for delivering an internet based service to the user equipment; and sending, to the base station, a query for information identifying a local server associated with the base station and capable for delivering an internet based service to the user equipment. The method also comprises receiving, from the base station, a confirmation response message comprising a global IP address of the local server; and sending, to the base station, a request for the internet based service, the request comprising the global IP address of the local server for enabling the local server to provide the Internet based service to the user equipment.

According to yet an aspect, a method in an Internet server for enabling provision of an Internet bases service to a user equipment served by a base station in a wireless communication network is provided. The method comprises receiving, from the user equipment a request for information regarding an Internet based service; and requesting the user equipment to obtain information identifying a local server capable of delivering the internet based service and associated with the base station or responding to the user equipment with a list of local servers capable of delivering the internet based service.

According to an aspect, a base station in a wireless communication network adapted to enable an Internet based service being provided to a user equipment is provided. The base station is associated with a local server, wherein the local server is capable of delivering the Internet based service. The base station comprises a processing unit adapted to receive, from the user equipment, information identifying the user equipment and to update a connection list in the base station by adding the information identifying the user equipment. The processing unit is further adapted to receive, from the user equipment, a query for information identifying the local server; and to send, to the user equipment, a confirmation response comprising a global IP address of the local server. The processing unit is also adapted to receive, from the user equipment, a request for the Internet based service, the request comprising the global IP address of the local server; and to mirror the connection list from the base station to the local server. Further, the processing unit is adapted to forward the request for the Internet based service to the local server, for enabling the local server to provide the Internet based service to the user equipment.

According to an aspect, a local server having a global IP address and being associated with a base station for providing an Internet based service to a user equipment is provided. The local server is capable of delivering the Internet based service and the local server comprises a processing unit adapted to receive a request for an Internet based service from the user equipment via the base station; and to receive a connection list being mirrored from the base station to the local server. The processing unit is further adapted to compare an information identifying the user equipment to information in the connection list; and to deliver the Internet based service from the local server to the user equipment via the base station in the event the information identifying the user equipment is included in the connection list.

According to still an aspect, a user equipment in a wireless communication network is provided. The user equipment comprises a processing unit adapted to send, to the base station, information identifying the user equipment, and to send a request for information regarding an Internet based service to an Internet server via the base station. The processing unit is further adapted to receive, from the Internet server, a request for obtaining information identifying a local server capable of delivering the Internet based service and being associated with the base station; and to send, to the base station, a query for information identifying a local server associated with the base station and capable of delivering an Internet based service to the user equipment. The processing unit is further adapted to obtain, from the base station, the global IP address of the local server; and to send, to the base station, a request for the Internet based service, the request comprising the obtained global IP address for enabling the local server to provide the Internet based service to the user equipment.

According to an aspect, an Internet server adapted to enable an Internet based service being provided to a user equipment served by a base station in a wireless communication network is provided. The Internet server comprises a processing unit adapted to receive, from the user equipment, a request for information regarding the Internet based service, the request identifying the wireless communication network. The processing unit is further adapted to request the user equipment to obtain information identifying a local server capable of delivering the internet based service and associated with the base station or responding to the user equipment with a list of local servers capable of delivering the internet based service.

The base station, the local server, the user equipment and the Internet server as well as the respective methods therein have several advantages. The base station enables the local server to deliver the Internet based service to the user equipment. Therefore, the communication or traffic between the Internet server and the user equipment is minimized. Hence the traffic between the base station and the packet gateway as well as the traffic between the packet gateway and the Internet server is minimized such that mainly signaling is performed between the user equipment and the Internet server. In this case, no data traffic needs to be communicated between the user equipment and the Internet server. This reduces the cost for the operator of the wireless communication network for delivering the Internet based service to the user equipment.

BRIEF DESCRIPTION OF DRAWINGS

Embodiments will now be described in more detail in relation to the accompanying drawings, in which.

DETAILED DESCRIPTION

Figure 1A:
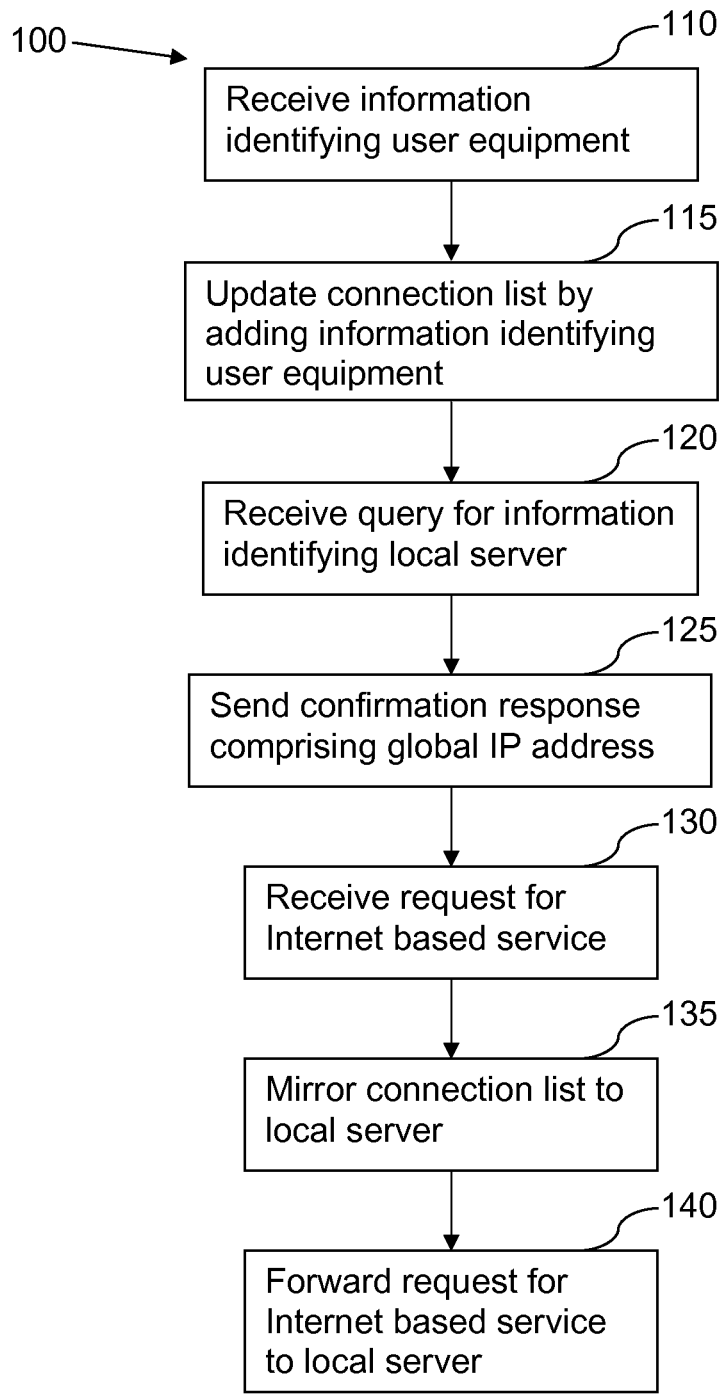
FIGS. 1a and 1b are flowcharts illustrating exemplifying embodiments of a method in a base station for enabling an Internet based service being provided to a user equipment.

Briefly described, exemplifying embodiments of a base station, a local server, a user equipment and in Internet server as well as methods therein are provided for delivering an Internet based service to the user equipment by means of a local server associated to the base station.

In order to minimize the use of communication between the packet gateway and the Internet server, one or more base stations in the wireless communication network are associated with one or more local servers. This also minimized the traffic between the base station and the Packet Gateway.

These local servers have had one or more Internet based services downloaded from an Internet server making them capable of delivering the downloaded Internet based service(s).

However, should the user equipment move around and, at some point during the delivery of an Internet based service from a local server, transfer, or be handed over, to a target base station, then the delivering of the Internet based service, according to embodiments herein, is moved to a local server associated with the target base station. Otherwise, the local server of the source base station, from which the user equipment is handed over, might risk becoming overloaded if it must deliver Internet based services to a vast amount of user equipments.

Hereinafter, the term user equipment is used to denote a mobile station, a mobile telephone, a smart phone, a laptop, a PDA or any other portable communication device being capable of receiving an Internet based service.

An Internet based service may be, for example, a audio or video clip from YouTube, an article from an online newspaper, a blog or personal ads on an Internet site and so on.

It shall be pointed out that, conventionally with regards to IPv4, addresses of nodes/entities located within the Internet are called global IP addresses and the addresses of nodes/entities in a wireless communication network are called private IP addresses. As a node, for example a user equipment, communicates with any node located within the Internet, the packet gateway translates private and global IP addresses. In IPv6, the addresses are grouped in different domains with similar characteristics, however there are no private or global addresses. Instead the addresses in IPv6 may be publicly available in a similar way as the global addresses in IPv4. Likewise the addresses in IPv6 may be limitedly accessible if the addresses belong, for example to an operator in a similar way as the private addresses in IPv4. The embodiments herein can be implemented in any network or system using IPv4 or IPv6. For simplicity reasons, addresses are only referred to as private or global, using the terminology for IPv4.

The embodiments described herein make use of information identifying the user equipment. Some examples of such information are International Mobile Subscriber Identity (IMSI), International Mobile Equipment Identity (IMEI), IP address of the user equipment, name of the user/subscriber of the user equipment, email address of user/subscriber of the user equipment or any other information identifying the user equipment.

The embodiments described herein helps preventing a local server from becoming overloaded as the ongoing session will also be handed over, either to a local server associated with the target base station, or the session of delivering the Internet based service will be provided by the Internet server.

Figure 1B:
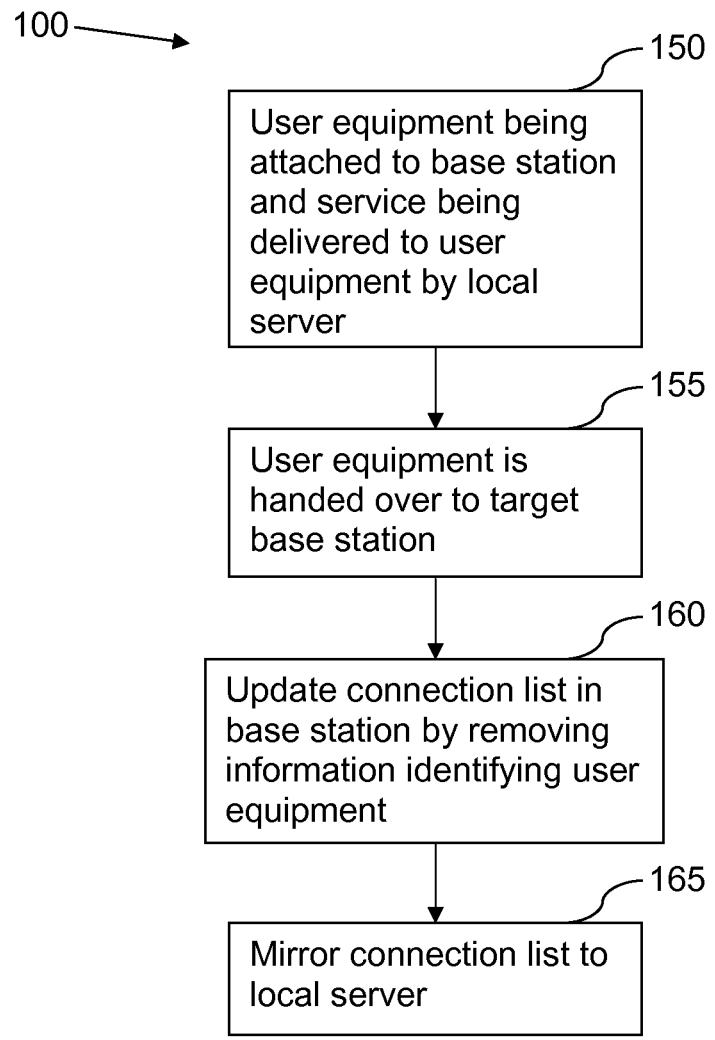

FIGS. 1a and 1b are flowcharts illustrating an exemplifying embodiment of a method 100 in a base station for enabling an Internet based service being provided to a user equipment, wherein the base station is associated with a local server capable of delivering the Internet based service.

FIG. 1a illustrates the method performed in a base station starting by receiving 110 information from the user equipment, the information identifying the user equipment. As the base station receives the information identifying the user equipment, the method also comprises updating 115 a connection list in the base station by adding the information identifying the user equipment. The connection list is held in and maintained the base station and it comprises information of user equipments being served by the base station and also a global IP address of the local server being associated with the base station.

The method further comprises receiving 120 a query for information identifying the local server from the user equipment and, in response thereto, sending 125 a confirmation response comprising the global IP address of the local server to the user equipment.

Further, the method comprises receiving 130 a request for the Internet based service from the user equipment, the request comprising the global IP address of the local server.

Thereafter, the method comprises mirroring 135 the connection list from the base station to the local server, and forwarding 140 the request for the Internet based service to the local server for enabling the local server to deliver the Internet based service to the user equipment.

As the received 130 request comprises the global IP address of the local server, the base station will forward 140 the request to the local server and not to the Internet server since the local server has a global IP address. The local server has had the Internet based service downloaded from the Internet server beforehand and is therefore capable of delivering the Internet based service to the user equipment. Therefore, the communication or traffic between the Internet server and the user equipment, and hence the packet gateway, is minimized such that mainly signaling is performed between the user equipment and the Internet server. In this case, no data traffic needs to be communicated between the user equipment and the Internet server. This reduces the cost for the operator of the wireless communication network for delivering the Internet based service to the user equipment, and an offloading of the data traffic is achieved between the mobile station and the Internet server.

According to an embodiment, receiving 110 the information identifying the user equipment comprises receiving a Non Access Stratum, NAS, service request comprising at least one identity of the user equipment.

This is the case if, for example, the user equipment is located within the cell comprising the base station and wishes to have the Internet service delivered to it. Then, the user equipment first sends a NAS service request to the base station in order for the base station to know the presence of the mobile station.

According to an embodiment, receiving 110 the information identifying the user equipment comprises receiving the information from the user equipment performing a handover to the base station.

In this case, the user equipment is having the Internet based service being delivered either by a local server associated with the source base station, from which the user equipment is handed over or from the Internet server. In such a case, when the user equipment is handed over to the base station, the base station receives information identifying the user equipment.

According to yet an embodiment, receiving 120 the query for information identifying the local server comprises receiving a request for at least one global IP address of at least one local server associated with the base station.

This means that the base station is asked/queried by the user equipment if it has any local server having a global IP address, which local server is capable of delivering the Internet based service. In such a case, the user equipment is to obtain the global IP address of the local server.

A base station may be associated with no local server, with one local server or with a plurality of local servers. Further, a local server may be associated with one base station or a plurality of base stations.

According to yet an embodiment, receiving 120 the query for information identifying the local server comprises receiving in the query a list comprising at least one global IP address obtained by the user equipment from an internet server. The method further comprises, in response to the query comprising the list, comparing the at least one global IP address in the list with a global IP of the local server associated with the base station and sending 125 the confirmation response comprising the global IP address of the local server.

In this embodiment, the base station receives a list of global IP addresses of at least one global IP address. The base station goes through or checks the list and compares the global IP addresses to the global IP address of the local server, which is associated with the base station. By responding with the global IP address of the local server associated with the base station, the user equipment is provided with the global IP address to use for receiving the Internet based service.

FIG. 1b is a flowchart illustrating an exemplifying embodiment of a method in a base station for enabling an Internet based service being provided to a user equipment, wherein the base station is associated with a local server capable of delivering the Internet based service.

In this embodiment, the user equipment is having the Internet based service delivered 150 to it by the local server being associated with the base station. The user equipment is handed over 155 from the base station to a target base station. It should be noted that the user equipment may also roam from a base station of a PLMN to a target base station of another PLMN. Hence the exemplifying embodiments herein are not restricted to handover scenario.

Referring back to the handover case of FIG. 1b, when the user equipment is handed over to the target base station, the method further comprises updating 160 the connection list in the base station by removing the information identifying the user equipment. The method further comprises mirroring 165 the connection list from the base station to the local server of the base station for enabling the local server to discover that it is providing the Internet based service to the user equipment which is no longer in the connection list.

Every time the connection list is updated, the base station mirrors the connection list to the local server. In other words, the connection list is copied to the local server. How the local server is enabled to discover that it is providing the Internet based service to the user equipment which is no longer in the connection list will be explained below.

Figure 2A:
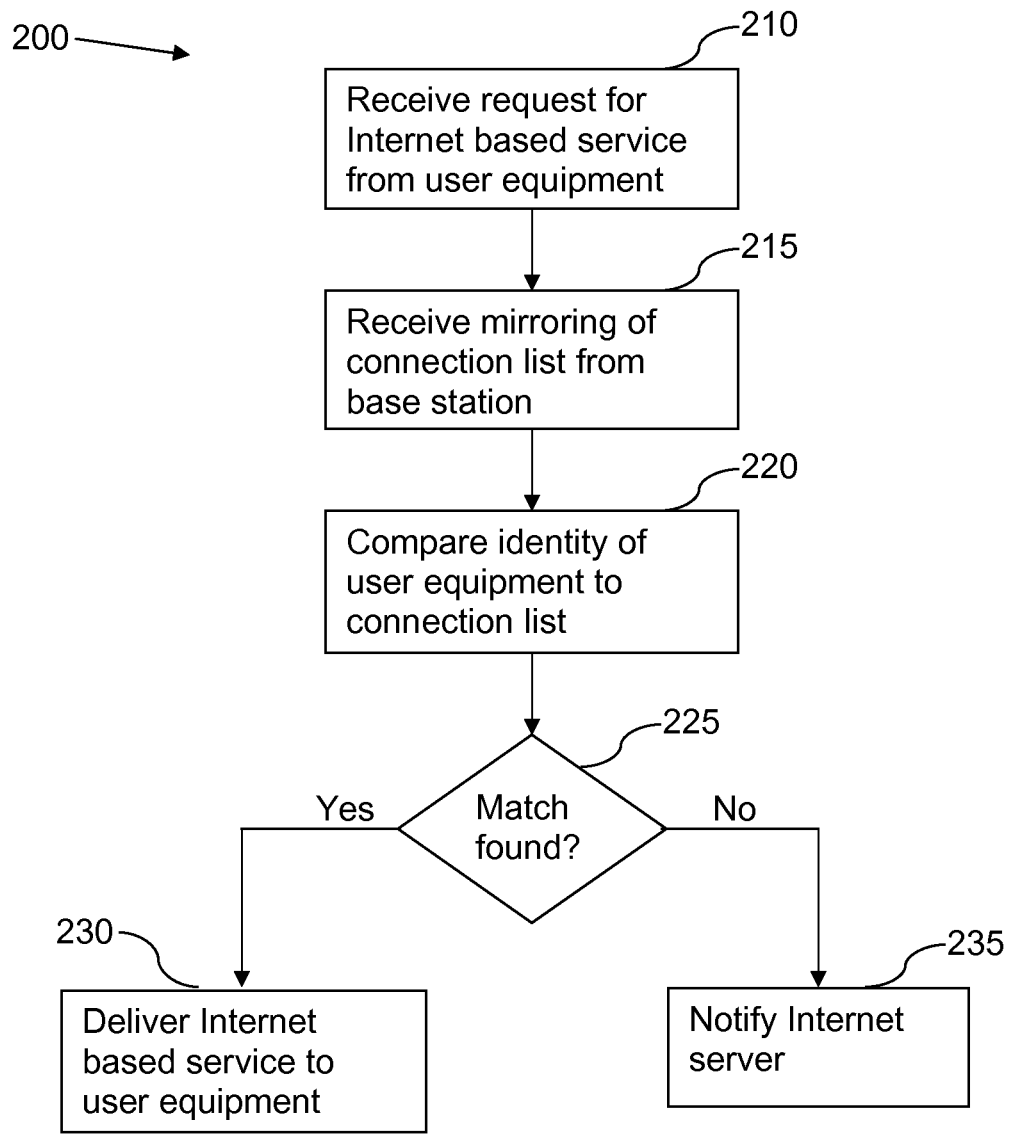
FIGS. 2a and 2b are flowcharts illustrating exemplifying embodiments of a method in a local server having a global IP address capable of delivering an Internet based service to a user equipment.

FIG. 2a is a flowchart illustrating an exemplifying embodiment of a method in a local server having a global IP address and capable of delivering an Internet based service to a user equipment.

FIG. 2a illustrates the method comprising receiving 210 a request for an Internet based service from the user equipment via the base station and receiving 215 a connection list being mirrored from the base station to the local server. The method further comprises comparing 220 an information identifying the user equipment to information in the connection list, and delivering 230 the Internet based service to the user equipment via the base station in the event the information identifying the user equipment is included in the connection list.

As described above, the local server has had the Internet based service downloaded beforehand in order to be capable of delivering the Internet based service to the user equipment. As the local server receives a mirroring of the connection list, the local server is able to check if the user equipment requesting the internet based service is in the connection list. Only if the user equipment is present in the mirrored connection list, it should get the Internet based service delivered by the local server.

In the case that the user equipment is not present in the connection list, the local server notifies 235 the Internet server. This will be described below.

Figure 2B:
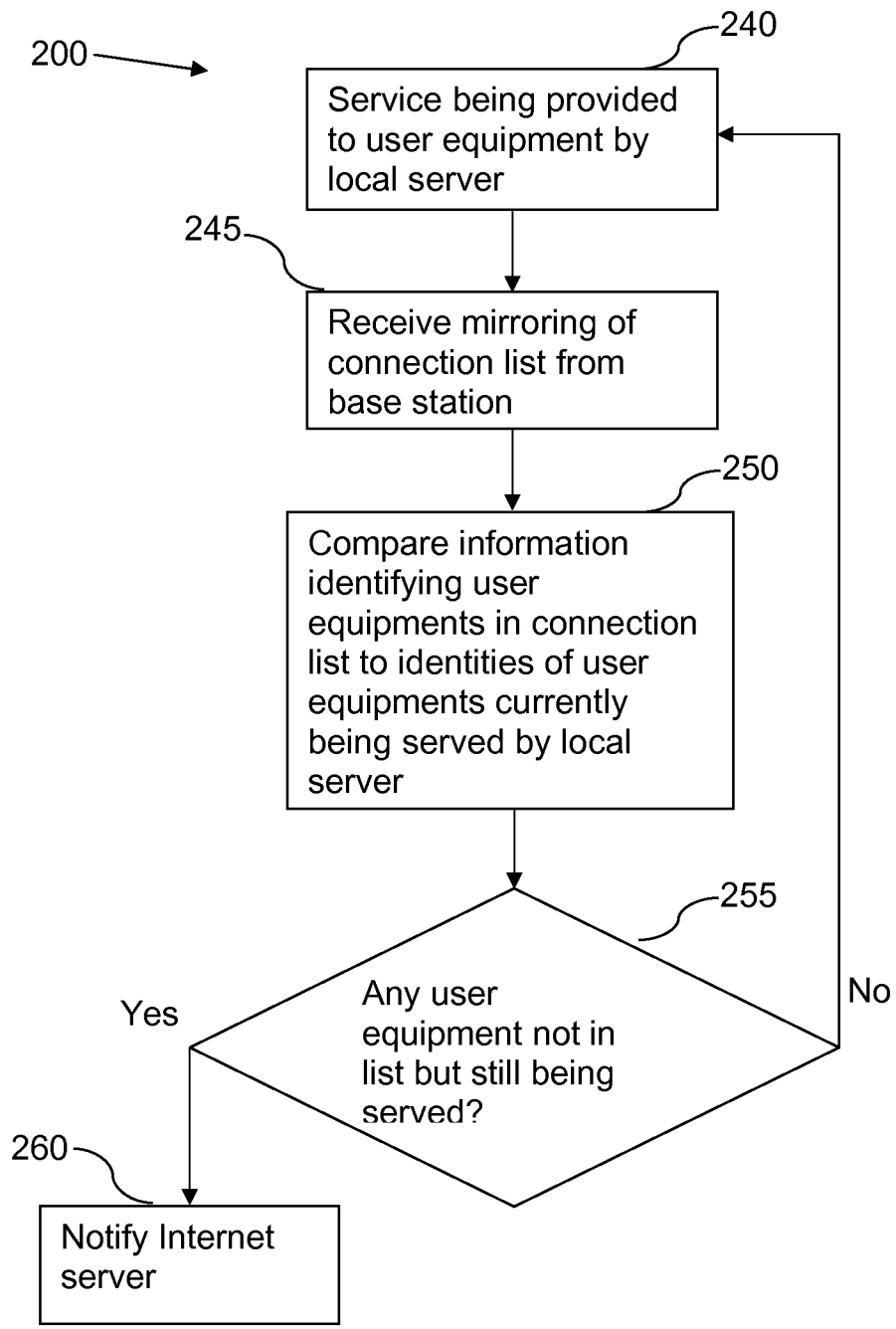

FIG. 2b is a flowchart illustrating an exemplifying embodiment of a method in a local server having a global IP address and capable of delivering an Internet based service to a user equipment.

In this embodiment, the local server is delivering 240 the Internet based service to the user equipment. The user equipment is handed over to a target base station as described above and the source base station handing over the user equipment to the target base station updates its connection list by removing information identifying the user equipment as previously described, see FIG. 1b.

As shown in FIG. 2b, the method further comprises receiving 245 a mirroring of the connection list from the (source) base station. The local server compares 250 the information identifying user equipments in the connection list to the user equipments currently having the Internet based service being delivered by the local server. The local server detects that it is delivering the Internet based service to the user equipment which is not in the connection list. In this case (YES), the method comprises notifying 260 the Internet server for enabling the Internet server to trigger the user equipment to start discovering another potential local server or for enabling the Internet server to send a list of servers hosting the requested Internet based service.

According to an embodiment, the method further comprising sending a report to the Internet server, the report comprising for example client data, session length and other information regarding the delivered Internet based service and possible also the user equipment receiving the Internet based service.

Figure 3A:
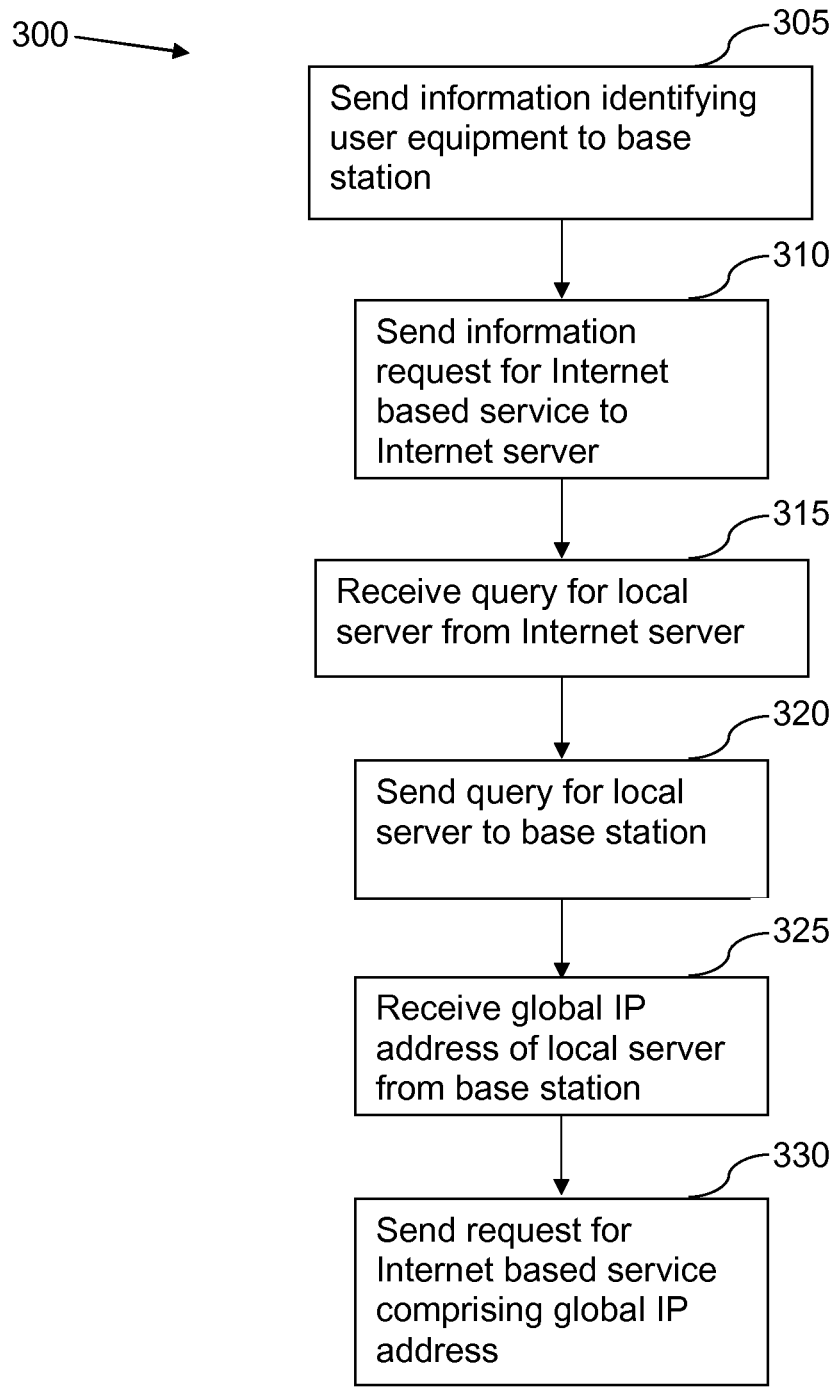
FIGS. 3a and 3b are flowcharts illustrating exemplifying embodiments of a method in a user equipment for obtaining delivery of an Internet based service to the user equipment.
Figure 3B:
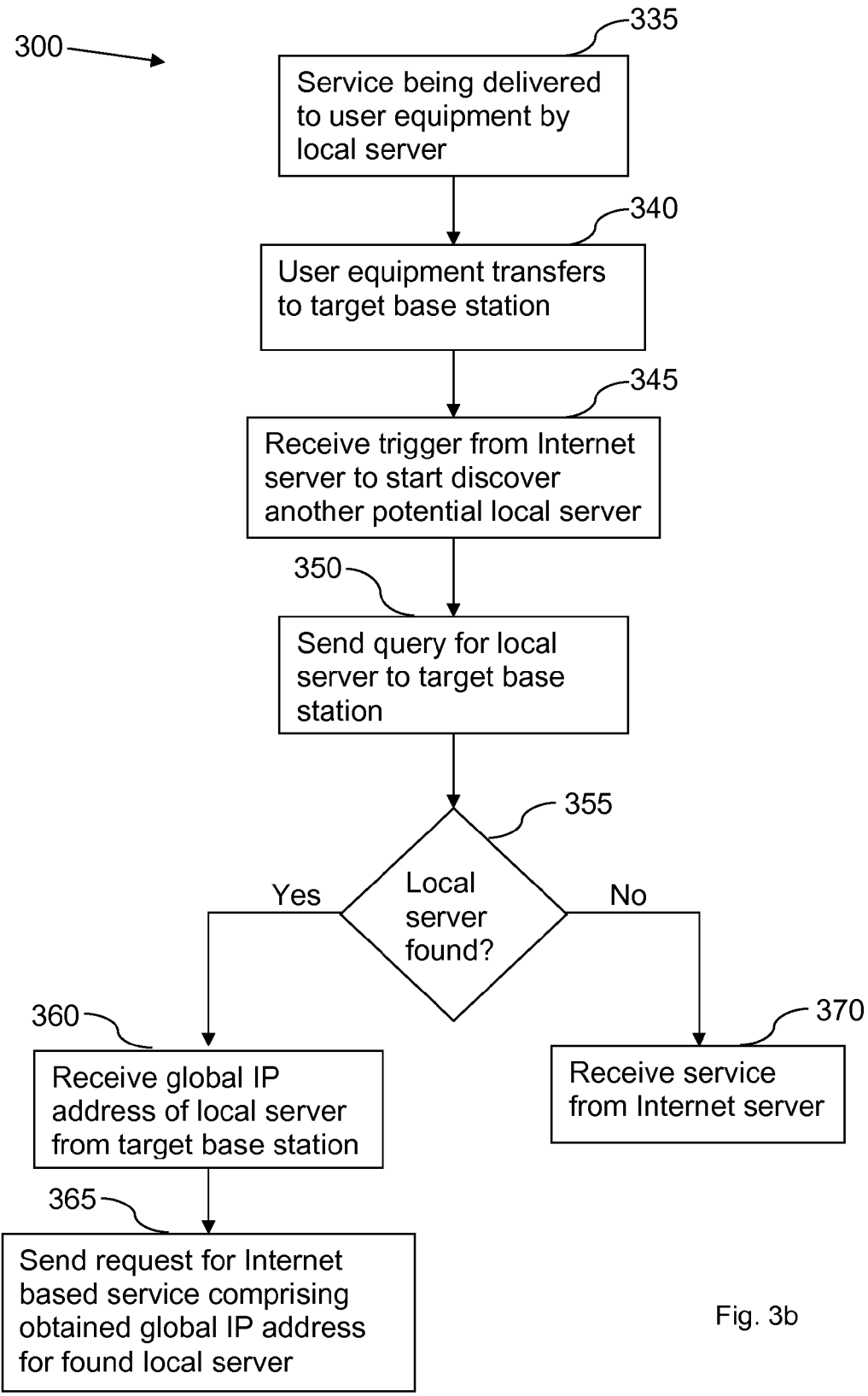

FIGS. 3a and 3b are flowcharts illustrating exemplifying embodiments of a method in a user equipment in a wireless communication network for obtaining delivery of an Internet based service to the user equipment.

Since the user equipment and the base station interact, some steps of the method in the user equipment correspond to steps of the method in the base station. These steps will not be elaborately described again, in order to avoid unnecessary repetition.

FIG. 3a illustrates the method comprising sending 305 information to a base station, the information identifying the user equipment, and sending 310 an information request for Internet based service to an Internet server. The method further comprises receiving 315 a query, from the Internet server, for information identifying a local server associated with the base station and capable for delivering an internet based service to the user equipment. Still further, the method comprises sending 320 a query, to the base station, for information identifying a local server associated with the base station and capable for delivering an internet based service to the user equipment. The method comprises receiving 325 a confirmation response message from the base station comprising a global IP address of the local server, and sending 330 a request for the internet based service to the base station, the request comprising the global IP address of the local server for enabling the local server to provide the Internet based service to the user equipment.

In this embodiment, the user equipment first makes itself known to the base station by sending 305 information to a base station, the information identifying the user equipment. When the user equipment then sends 310 an information request for Internet based service to an Internet server, it receives a query to find out if there is a local server associated with the base station which is capable of delivering the Internet based service. The user equipment asks/queries the base station if that is the case in step 320 and gets a positive response in step 325. By now, the user equipment has received (in step 325) a global IP address of the local server associated with the base station which is capable of delivering the Internet based service. The user equipment then uses this global IP address to request the service in step 330. This way, again the communication or traffic between the Internet server and the user equipment, and hence the packet gateway, is minimized such that mainly signaling is performed between the user equipment and the Internet server.

According to an embodiment, sending 305 the information identifying the user equipment comprises sending a Non Access Stratum, NAS, service request comprising at least one identity of the user equipment.

According to still an embodiment, sending 305 the information identifying the user equipment comprises sending the information from the user equipment performing a handover to the base station.

According to yet an embodiment, sending 320 the query for information identifying the local server comprises sending a request for at least one global IP address of at least one local server associated with the base station.

Still further, according to an embodiment, sending 320 the query for information identifying the local server comprises sending in the query a list comprising at least one global IP address obtained by the user equipment from the internet server, for enabling the base station to compare the at least one global IP address in the list with a global IP of the local server associated with the base station.

Sending 320 the query for information identifying the local server is performed in response to receiving 315 the query, from the Internet server, for information identifying a local server associated with the base station and capable for delivering an internet based service to the user equipment.

In an example, in the event the user equipment has sent 320 a request for at least one global IP address of at least one local server associated with the base station and thereafter received 325 the global IP address of the local server capable of delivering the Internet based service, the user equipment asks/queries the Internet server if the received global IP address represents a local server capable of delivering the Internet base service in question. After the Internet server confirms that the local server is capable of delivering the Internet base service in question, the user equipment sends 330 the request for the internet based service to the base station, the request comprising the global IP address of the local server for enabling the local server to provide the Internet based service to the user equipment.

In yet an example, in the event the user equipment has sent 320 in a query a list comprising at least one global IP address obtained by the user equipment from the internet server. This list enables the base station to compare the at least one global IP address in the list with a global IP of the local server associated with the base station. If the user equipment receives 325 a confirmation from the base station that the base station is associated with a local server having a global IP address which is in the list, then the mobile may simply send 330 a request to the base station for the Internet based service, the request comprising the global IP address of the local server.

FIG. 3*b* is a flowchart illustrating an exemplifying embodiment of a method in a user equipment in a wireless communication network for obtaining delivery of an Internet based service to the user equipment.

In this embodiment, the user equipment is having an Internet based service being delivered 335 by a local server. The user equipment roams and is handed over 340 to a target base station. Again, a roaming scenario, as previously mentioned, is also possible instead of a handover scenario.

FIG. 3*b* illustrates the method comprising receiving 345 a trigger from the Internet server, and starting discovering of another potential local server or receiving from the internet server a list of local servers capable of delivering the internet based service.

In this embodiment, when the user equipment has been handed over to a target base station, the base station updates the connection list and mirrors it to the local server, which in turn discovers that it is delivering the Internet based service to the user equipment which is no longer in the connection list. The local server notifies the Internet server and the Internet server, in response to this notification; and sends the trigger which is received 345 by the user equipment. The trigger may partly or completely correspond to the step of receiving 315 a query as previously described.

By receiving 345 this trigger, the user equipment requests for information identifying a local server associated with the base station and capable for delivering an internet based service to the user equipment.

The discovering of a potential local server capable of delivering the Internet based service or receiving from the internet server a list of local servers capable of delivering the Internet based service is followed by the method steps of sending 350 a query for information identifying the local server comprising sending a request for at least one global IP address of at least one local server associated with the base station.

FIG. 3*b* illustrates the case in which the target base station is not associated with a local server. In this embodiment, the user equipment receives 370 the Internet based service from the Internet server.

FIG. 3*b* is somewhat simplified in the case in which the target base station is not associated with a local server. The user equipment will receive a response from the base station that the base station is not associated with a local server having a global IP address. This will cause the user equipment to request the Internet based service from the Internet server.

FIG. 3*b* also illustrates the case in which the target base station is associated with a local server capable of delivering the Internet based service to the user equipment. Is this embodiment, the method comprises sending 350 a query, to the target base station, for information identifying a local server associated with the target base station and which is capable of delivering the Internet based service to the user equipment. The method further comprises receiving 360 a confirmation response message from the base station comprising a global IP address of the local server; and sending 365 a request for the internet based service to the base station, the request comprising the global IP address of the local server for enabling the local server to provide the Internet based service to the user equipment.

The method steps 345, 350, 360 and 365 correspond to the above described method steps of 315, 320, 325 and 330 in FIG. 3*a*. This is hereinafter referred to as the discovering process.

Figure 4:
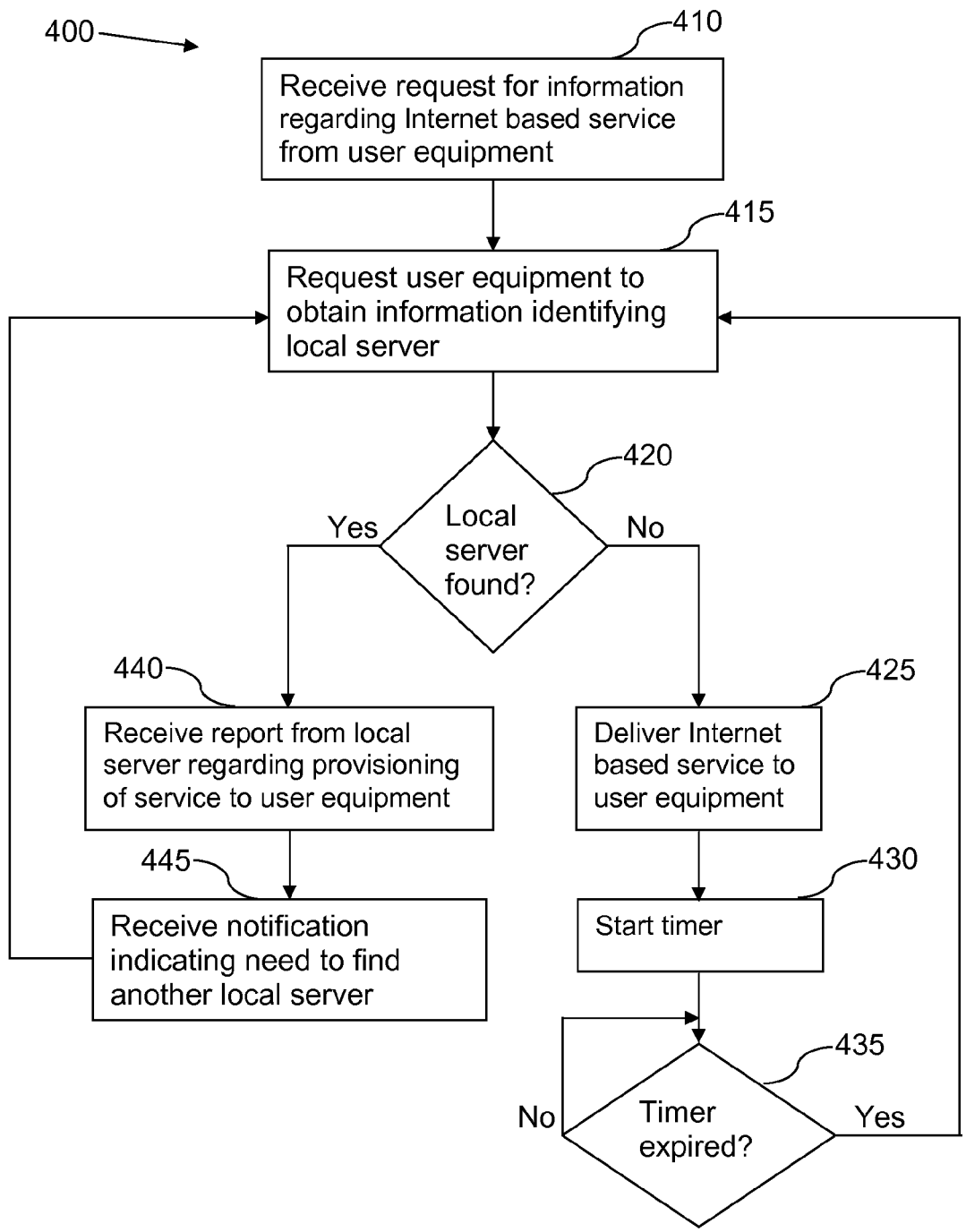
FIG. 4 is a flowchart illustrating an exemplifying embodiment of a method in an Internet server for delivery of an Internet based service to a user equipment.

Turning now to FIG. 4, which is a flowchart illustrating an exemplifying embodiment of a method in an Internet server for delivery of an Internet based service to a user equipment which is served by a base station in a wireless communication network.

FIG. 4 illustrates the method comprising receiving 410 a request for information regarding an Internet based service from the user equipment. The method further comprises requesting 415 the user equipment to obtain information identifying a local server capable of delivering the internet based service and associated with the base station or responding to the user equipment with a list of local servers capable of delivering the internet based service.

The request for information regarding an Internet based service which is received from the user equipment in step 410 comprises information regarding the requested service. The request further comprises information identifying the wireless communication network in which the user equipment resides. From the information identifying the wireless communication network, the Internet server is able to deduce that the wireless communication network comprises at least one local server having a global IP address. The local server is also able to deduce that it has downloaded the requested Internet based service to at least one of the at least one local server in the wireless communication network.

According to an embodiment, in the event the base station fails in having a local server associated to it capable of delivering the Internet based service, the method comprises delivering 425 the requested Internet based service to the user equipment.

According to an embodiment, in the event the Internet based service is being delivered to the user equipment by the Internet server, and in the event the base station is associated with a local server but the internet server is unaware that the local server is capable of delivering the internet based service, the method comprises regularly requesting 415 the user equipment to obtain information identifying a potential local server having a global IP address capable of delivering the internet based service.

This is illustrated in FIG. 4 by starting 430 a timer when the Internet server starts delivering the Internet based service to the user equipment. When the timer expires, the Internet server requests 415 the user equipment to obtain information identifying a potential local server having a global IP address capable of delivering the internet based service. One reason for doing this is that the user equipment may possibly do handover or roaming to another base station having a local server capable of delivering the Internet based service which is currently being delivered by the Internet server. By regularly requesting 415 the user equipment to obtain information identifying a potential local server having a global IP address capable of delivering the internet based service, the user equipment is enabled to discover a potential local server in case the user equipment has been handed over to a base station associated with a local server having a global IP address capable of delivering the internet based service.

FIG. 4 also illustrates an exemplifying embodiment, in the event the base station is associated with a local server and the Internet based service is being delivered from the local server. In this embodiment, the method 400 in the Internet server comprises receiving 440 a report from the local server regarding the delivery of the Internet based service to the user equipment. The report may comprise information such as session length and other information related to the service being delivered to the user equipment.

FIG. 4 further illustrates an exemplifying embodiment, in the event the user equipment is handed over from a source base station being associated with a local server currently delivering the Internet based service to the user equipment to a target base station. In this embodiment, the method comprises receiving 445 a notification message from the local server currently delivering the Internet based service to the user equipment. The notification message informs the Internet server that a potential other local server capable of delivering the Internet based service needs to be found or the Internet server itself needs to deliver the Internet based service in case no other local server capable of delivering the Internet based service is found or discovered.

According to an exemplifying embodiment, the method comprises requesting 415 the user equipment to obtain information identifying a local server capable of delivering the internet based service and associated with the base station. In this embodiment, the method further comprises receiving a further query from the user equipment, in the event a local server having a global IP address is discovered. The query comprises the obtained global IP address of the local server obtained by the user equipment. The method comprises checking in the Internet server if it has downloaded the requested Internet based service to the local server having the global IP address received in the query in order to ascertain that the local server is capable of delivering the Internet based service. If the local server is capable of delivering the Internet based service, the method comprises sending a confirmation message to the user equipment that the global IP address is to be used to the delivery of the Internet based service.

Embodiments herein also relate to a base station, a local server, a user equipment and an Internet server. These will be described more briefly as they have the same objects and advantages as the methods therein described above.

Figure 5A:
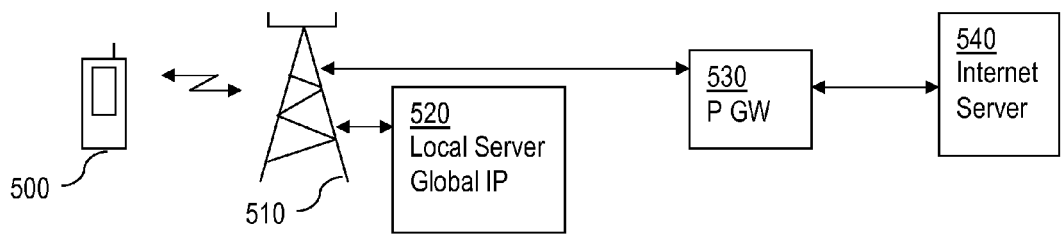
FIG. 5a is a schematic illustration of an embodiment of a communication system wherein an Internet based service is delivered by a local server.

FIG. 5a is a schematic illustration of an embodiment of a communication system wherein an Internet based service is delivered by a local server.

FIG. 5a illustrates a user equipment 500 being served by a base station 510. The base station is associated with a local server 520 having a global IP address and being capable of delivering an Internet based service to the user equipment 500. The base station may communicate with a Packet Gateway, PGW, 530. There may be several nodes or devices supporting the communication between the base station 510 and the PGW 530, for example a switching center or the like. Any such nodes or devices are not shown in FIG. 5a for simplicity reasons. Further, the PGW 530 can communicate with an Internet server 540. This way, a user equipment 500 may access or communicate with the local server 520 and the Internet server 540.

It shall be pointed out that the local server 520 may be associated with more than just one base station 510. Further, the base station 510 may be associated with more than one local server 520.

Figure 5B:
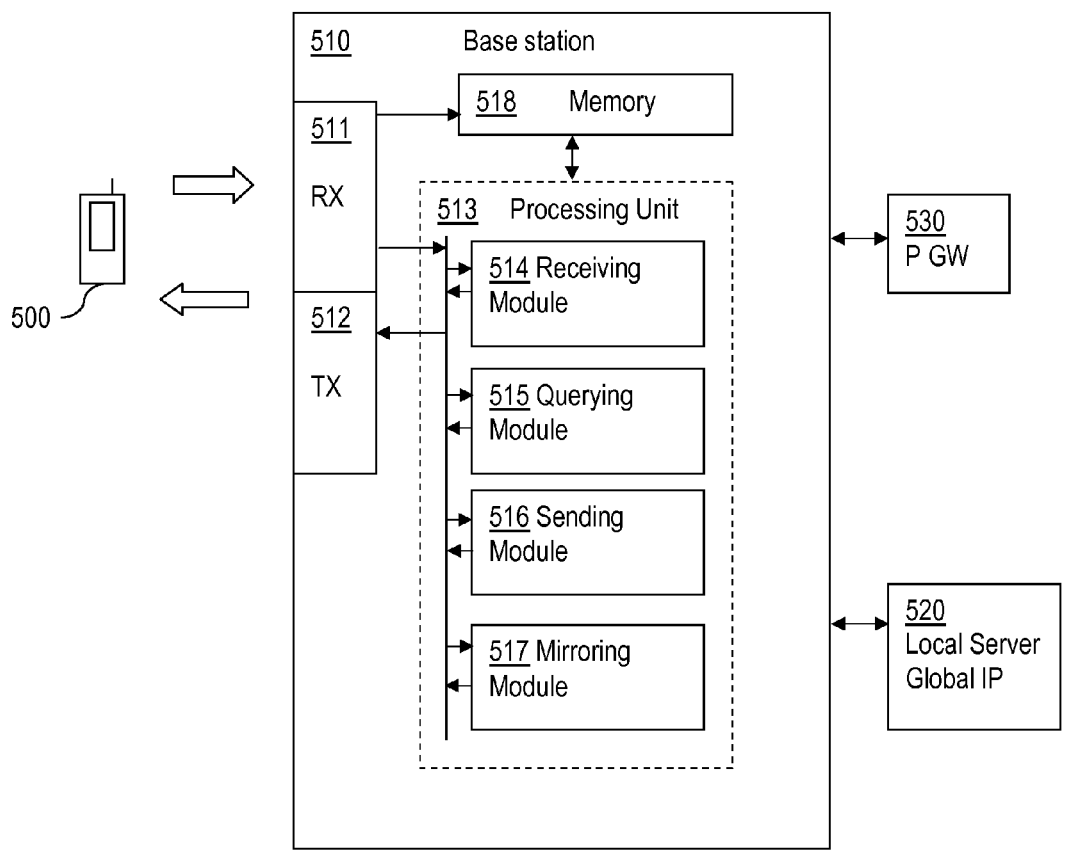
FIG. 5b is a schematic illustration of an embodiment of a base station in a wireless communication network adapted to enable an Internet based service being provided to a user equipment.

FIG. 5b is a schematic illustration of an embodiment of a base station in a wireless communication network adapted to enable an Internet based service being provided to a user equipment.

The base station 510 comprised in a wireless communication network is illustrated comprising a receiving, RX, 511 and transmitting, TX, 512 unit for supporting communication with the user equipment 500. The base station 510 is also illustrated comprising a memory 518 and a processing unit 513. Further, the base station is illustrated being able to communicate with the PGW 530 and being associated with the local server 520, which is capable of delivering the Internet based service.

The base station 510 is adapted to enable an Internet based service being provided to the user equipment 500. The processing unit 513 is adapted to receive information from the user equipment, the information identifying the user equipment. The processing unit 513 is further adapted to update a connection list in the base station 510 by adding the information identifying the user equipment 500. The processing unit 513 is also adapted to receive a query for information identifying the local server 520 from the user equipment 500, and to send a confirmation response comprising a global IP address of the local server 520 to the user equipment 500. The processing unit 513 is adapted to receive a request for the Internet based service from the user equipment 500, the request comprising the global IP address of the local server 520, and to mirror the connection list from the base station 510 to the local server 520. Further, the processing unit 513 is adapted to forward the request for the Internet based service to the local server 520, for enabling the local server 520 to provide the Internet based service to the user equipment 500.

FIG. 5b illustrates the processing unit 513 comprising exemplifying modules for performing the actions described above. For example, the processing unit 513 may comprise a receiving module 514, a querying module 515, a sending module 516 and a mirroring module 517 and other modules not shown in the figure.

According to an embodiment, the reception of the information identifying the user equipment comprises reception of a Non Access Stratum, NAS, service request comprising at least one identity of the user equipment 500.

According to yet an embodiment, the reception of the information identifying the user equipment 500 comprises receiving the information from the user equipment performing a handover to the base station.

According to still an embodiment, the reception of the query for information identifying the local server comprises reception of a request for at least one global IP address of at least one local server 520 associated with the base station 510.

Still further, according to an embodiment, the reception of the query for information identifying the local server comprises reception, in the query, of a list comprising at least one global IP address obtained by the user equipment 500 from an Internet server (540). The processing unit 513 in this embodiment is adapted to, in response to the query comprising the list, compare the at least one global IP address in the list with a global IP address of the local server 520 associated with the base station 510, and if a match is found, the processing unit 513 is adapted to include the global IP address of the local server 520 associated with the base station 510 in the confirmation response.

According to an embodiment, in the event the user equipment is handed over from the base station to a target base station, the processing unit 513 is adapted to update the connection list in the base station 510 by removing the information identifying the user equipment 500, and to mirror the connection list from the base station 510 to the local server 520 associated with the base station 510, for enabling the local server 520 to discover that it is providing the Internet based service to the user equipment 500 which is no longer in the connection list.

Figure 5C:
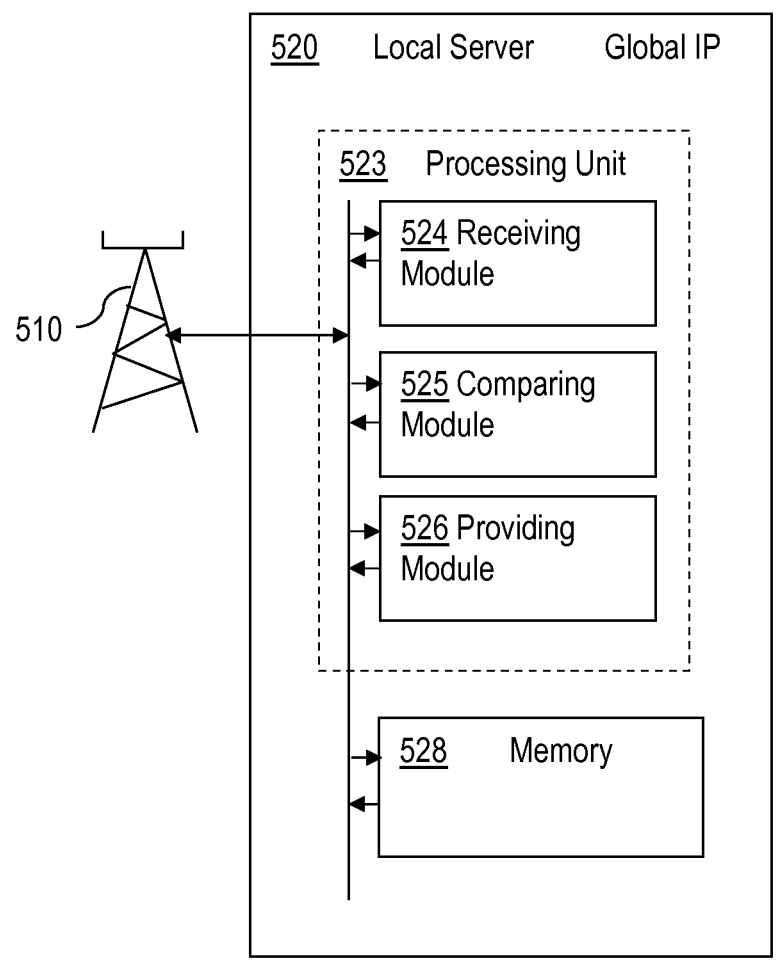
FIG. 5c is a schematic illustration of an embodiment of a local server having a global IP address and being associated with a base station for providing an Internet based service to a user equipment.

FIG. 5c is a schematic illustration of an embodiment of a local server having a global IP address and being associated with a base station wherein the local server is capable of delivering an Internet based service to a user equipment.

The local server 520 is illustrated comprising a processing unit 523 and a memory 528. The local server is associated and is configured to communicate with the base station 510.

The processing unit 523 is adapted to receive a request for an Internet based service from the user equipment 500 (not shown) via the base station 510. The processing unit 523 is further adapted to receive a connection list being mirrored from the base station 510 to the local server 520. The processing unit 523 is adapted to compare an information identifying the user equipment 500 to information in the connection list and to deliver the Internet based service from the local server 520 to the user equipment 500 via the base station 510 in the event the information identifying the user equipment is included in the connection list.

According to an embodiment, an additional mirroring of a connection list from the base station is received. The processing unit 523 is adapted to compare all the identities of user equipments comprised in the list to the identities of user equipments currently having Internet based services being delivered by the local server 520. If a user equipment currently has an Internet based service being delivered by the local server 520, which user equipment is not in the connection list, the processing unit 523 is adapted to send a notification message to the Internet server 540 for enabling the Internet server 540 to trigger the user equipment to start discovering a potential other local server having another global IP address associated with another base station.

FIG. 5c illustrates the processing unit 523 comprising exemplifying modules for performing the actions described above. For example, the processing unit 523 may comprise a receiving module 524, a comparing module 525, and a providing module 526.

Figure 5D:
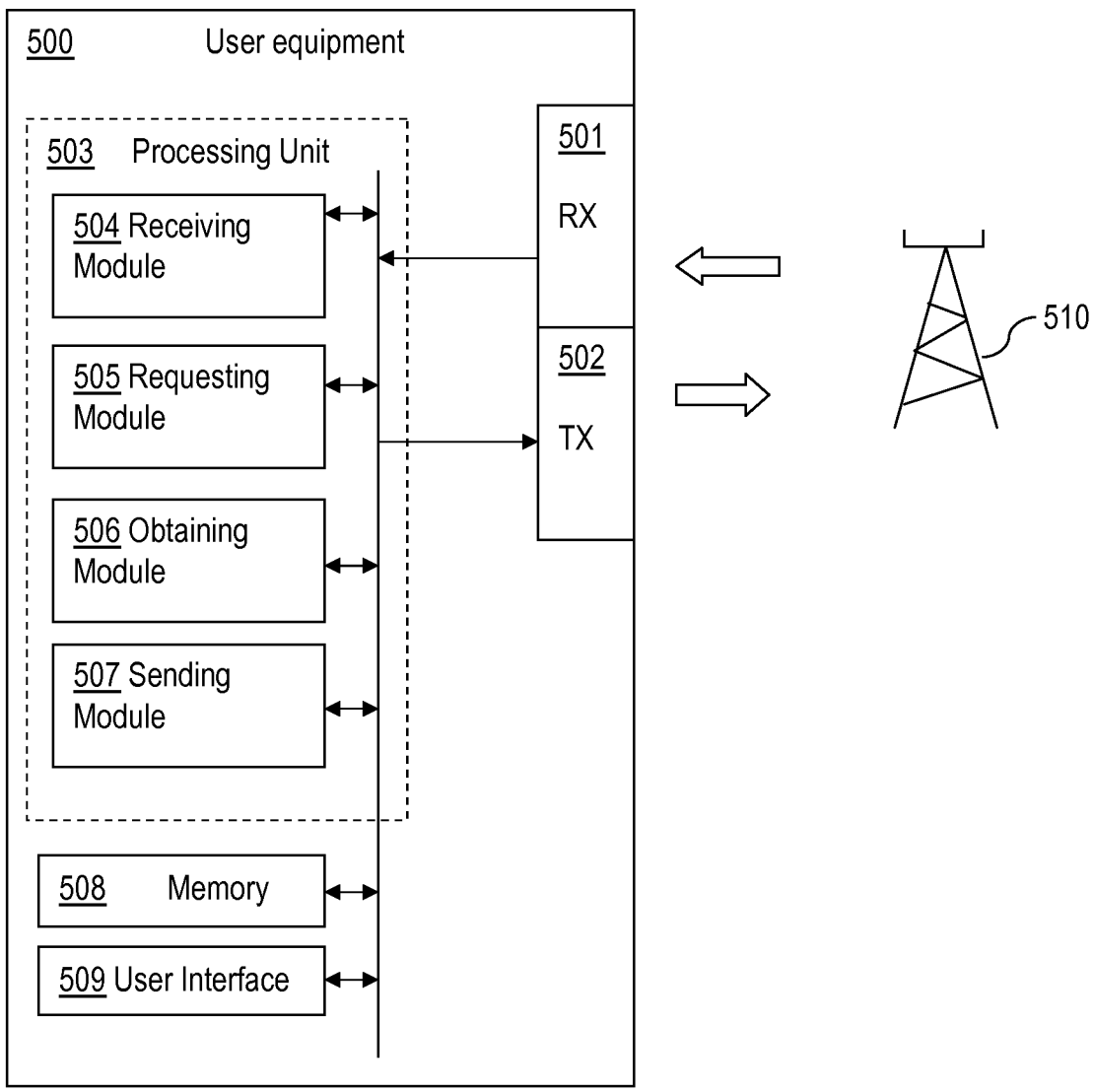
FIG. 5d is a schematic illustration of an embodiment of a user equipment in a wireless communication network for obtaining delivery of an Internet based service to the user equipment.

FIG. 5d is a schematic illustration of an embodiment of a user equipment in a wireless communication network for obtaining delivery of an Internet based service to the user equipment.

The user equipment 500 is illustrated comprising a receiving, RX, 501 and transmitting, TX, 52 unit for supporting communication with the base station 510. The user equipment 500 is also illustrated comprising a memory 508, a user interface 509 and a processing unit 503. The user equipment is used in a wireless communication network comprising the user equipment 500, the base station 510, the local server 520 (not shown) and the PGW 530 (not shown).

According to an exemplifying embodiment, the processing unit 503 is adapted to send information to the base station 510, the information identifying the user equipment 500. The processing unit 503 is also adapted to send a request for information regarding an Internet based service to an Internet server 540 via the base station 510. Further, the processing unit 503 is adapted to receive, from the Internet server 540, a request for obtaining information identifying a local server 520 capable of delivering the Internet based service and being associated with the base station 510. Still further, the processing unit 503 is adapted to send a query to the base station 510 for information identifying a local server 520 associated with the base station 510 and capable of delivering an Internet based service to the user equipment 500. The processing unit 503 is also adapted to obtain the global IP address of the local server 520 from the base station 510, and to send a request for the Internet based service to the base station 510, the request comprising the obtained global IP address for enabling the local server 520 to provide the Internet based service to the user equipment 500.

According to an embodiment, the information identifying the user equipment 500 that is sent to the base station 510 comprises a Non Access Stratum, NAS, service request comprising at least one identity of the user equipment 500.

According to yet an embodiment, the processing unit 503 is adapted to send the information identifying the user equipment 500 to the base station 510 when the user equipment 500 is performing a handover to the base station 510.

Further, according to an embodiment, the received request, from the Internet server, for the local server 520 comprises a request for at least one global IP address of at least one local server associated with the base station 510, wherein the obtaining the global IP address of the local server from the base station 510 comprises the processing unit 503 being adapted to request and receive the global IP address of the local server 520 from the base station 510.

Still further, according to an embodiment, the received request, from the Internet server, for the local server 520 comprises a list of at least one global IP address, wherein the obtaining, from the base station 510, the global IP address of the local server 520 associated with the base station 510 comprises the processing unit 503 being adapted to send the list of at least one global IP address to the base station 510 and, in response thereto, receive, from the base station 510, the global IP address of the local server 520 associated with the base station 510.

According to an embodiment, the user equipment is handed over from the base station 510 to a target base station. In this embodiment, the processing unit 503 is adapted to receive a trigger from the Internet server 540 and starting discovering another potential local server, or to receive, from the Internet server 540 a list of local servers capable of delivering the Internet based service.

According to still an embodiment, in the event the target base station fails in having a local server associated to it, the process unit 503 being adapted to receive the Internet based service from the Internet server 540.

Still further, according to an embodiment, in the event the target base station is associated with a local server, the processing unit 503 is adapted to send a query for information to the target base station 510, the information identifying a local server associated with target the base station and capable for delivering an internet based service to the user equipment 500. The processing unit 503 is further adapted to receive a confirmation response message from the target base station 510 comprising a global IP address of the local server 520 associated with the target base station 510. The processing unit 503 is also adapted to send a request for the internet based service to the target base station 510, the request comprising the global IP address of the local server 520 for enabling the local server 520 associated with the target base station 510 to provide or deliver the Internet based service to the user equipment 500.

FIG. 5d illustrates the processing unit 503 comprising exemplifying modules for performing the actions described above. For example, the processing unit 503 may comprise a receiving module 504, a requesting module 505, an obtaining module 506 and a sending module 507.

Figure 5E:
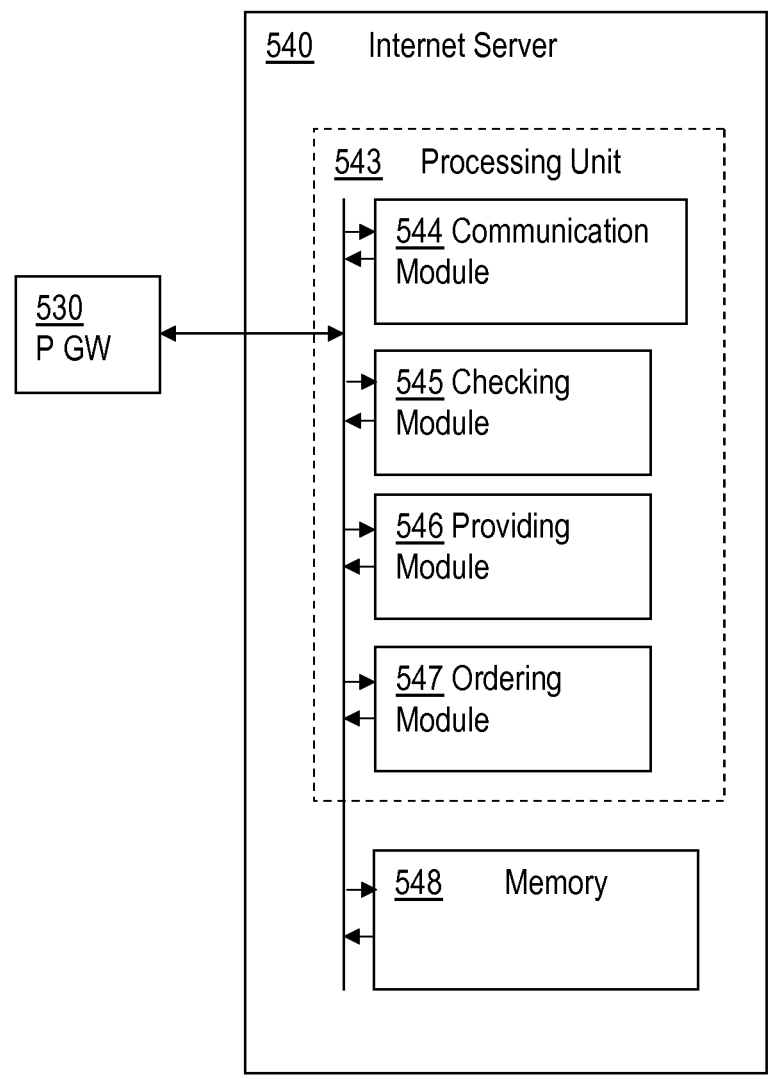
FIG. 5e is a schematic illustration of an embodiment of an Internet server for delivery of an Internet based service to a user equipment.

Turning now to FIG. 5e which is a schematic illustration of an embodiment of an Internet server for delivery of an Internet based service to a user equipment.

The Internet server 540 is illustrated comprising a memory 548, which may comprise several memory elements and/or databases. The Internet server also comprises a processing unit 543. The Internet server 540 is adapted to enable an Internet based service being provided to a user equipment 500 (not shown) served by a base station in a wireless communication network, the base station being associated with a local server capable of delivering the Internet based service being provided to the user equipment 500.

The processing unit 543 is adapted to receive a request for information regarding the Internet based service from the user equipment 500, the request identifying the wireless communication network. The processing unit 543 is further adapted to request the user equipment 500 to obtain information identifying a local server 520 capable of delivering the internet based service and associated with the base station 510 (not shown) or responding to the user equipment 500 with a list of local servers capable of delivering the internet based service.

As described above, the received request for information regarding the Internet based service from the user equipment 500 comprises information identifying the wireless communication network. This information enables the Internet server to deduce that the wireless communication network comprises local servers having a global IP address. The information also enables the Internet server to deduce that the requested Internet based service has been downloaded beforehand to at least one local server in the wireless communication network, thereby being capable of delivering the requested Internet based service.

According to an embodiment, in the event the base station fails in having a local server associated to it, the processing unit 543 is adapted to deliver the Internet based service to the user equipment 500.

According to yet an embodiment, in the event the Internet based service is being delivered to the user equipment 500 by the Internet server 540, the processing unit 543 is adapted to regularly request the user equipment 500 to obtain information identifying a potential local server capable of delivering the internet based service.

According to still an exemplary embodiment, the processing unit is adapted to receive reports from the local server, the reports comprising for example client data, IP address of user equipment, session length and other information related to the delivered Internet based service. The received reports enables to Internet server to store statistics of the delivered Internet based service, even though the service was not delivered by the Internet server itself.

FIG. 5e illustrates the processing unit 543 comprising exemplifying modules for performing the actions described above. For example, the processing unit 543 may comprise a communication module 544, a checking module 545, a providing module 546 and an ordering module 547.

It should be noted that FIGS. 5b-5e merely illustrates various functional units and/or modules in the base station, the local server, the user equipment and the internet server in a logical sense. The functions in practice may be implemented using any suitable software and hardware means/circuits etc. Thus, the embodiments are generally not limited to the shown structures of the base station, the local server, the user equipment and the internet server, and the functional units and/or modules. Hence, the previously described exemplary embodiments may be realised in many ways. For example, one embodiment includes a computer-readable medium having instructions stored thereon that are executable by the respective processing units 513, 523, 503 and 543 for executing the method in the base station, the local server, the user equipment and the internet server respectively. The instructions executable by the computing system and stored on the computer-readable medium perform the method steps of the present invention as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a base station of a wireless communication network for enabling provision of an Internet based service to a user equipment, the base station being associated with a local server capable of delivering the Internet based service, the method comprising:
receiving, from the user equipment, information identifying the user equipment,
updating a connection list in the base station by adding the information identifying the user equipment,
receiving, from the user equipment, a query for information identifying the local server, wherein receiving the query for information identifying the local server comprises receiving in the query a list comprising at least one global IP address obtained by the user equipment from an internet server,
in response to the query comprising the list, comparing the least one global IP address in the list with a global IP of the local server associated with the base station, and wherein sending the confirmation response comprises the global IP address of the local server,
sending, to the user equipment, a confirmation response comprising a global IP address of the local server in response to the query for information identifying the local server received from the user equipment, wherein if a match is found, including the global IP address of the local server associated with the base station in the confirmation response,
receiving, from the user equipment, a request for the Internet based service, the request comprising the global IP address of the local server,
mirroring the connection list from the base station to the local server, and
forwarding the request for the Internet based service to the local server for enabling the local server to deliver the Internet based service to the user equipment.

2. The method according to claim 1, wherein said receiving the information identifying the user equipment comprises receiving a Non Access Stratum, NAS, service request comprising at least one identity of the user equipment.

3. The method according to claim 1, wherein said receiving the information identifying the user equipment comprises receiving said information from the user equipment performing a handover to the base station.

4. The method according to claim 1, wherein receiving the query for information identifying the local server comprises receiving a request for at least one global IP address of at least one local server associated with the base station.

5. The method according to claim 1, wherein in the event the user equipment is handed over from the base station to a target base station, the method comprises:
updating the connection list in the base station by removing the information identifying the user equipment, and
mirroring the connection list from the base station to the local server of the base station, for enabling the local server to discover that the user equipment is no longer in the connection list.

6. A method in a local server having a global IP address and being associated with a base station, and capable of delivering an Internet based service to a user equipment, the method comprising:
receiving a request for an Internet based service from the user equipment via the base station,
receiving a connection list being mirrored from the base station to the local server, wherein the connection list comprises information of each of a plurality of user equipments being served by the base station and the global IP address of the local server associated with the base station,
comparing an information identifying the user equipment to information in the connection list,
delivering the Internet based service to the user equipment via the base station in the event the information identifying the user equipment is included in the connection list, and
in the event the information identifying the user equipment is not included in the connection list and the local server is delivering the internet based service to the user equipment, notifying an Internet server for enabling the Internet server to trigger the user equipment to discover another potential local server, or for enabling the Internet server to send a list of servers hosting the requested Internet based service.

7. A base station in a wireless communication network adapted to enable an Internet based service to a user equipment, the base station being associated with a local server, wherein the local server is capable of delivering the Internet based service, the base station comprising:
a receiving and transmitting unit that enables communication with the user equipment and the local server;
a memory storing instructions to be executed by a processing unit; and
the processing unit, wherein the processing unit is adapted to:
receive, from the user equipment, information identifying the user equipment,
update a connection list in the base station by adding the information identifying the user equipment,
receive, from the user equipment, a query for information identifying the local server, wherein the reception of the query for information identifying the local server comprises reception, in the query, of a list comprising at least one global IP address obtained by the user equipment from an Internet server,
in response to the query comprising the list, compare the at least one global IP address in the list with a global IP address of the local server associated with the base station,
send, to the user equipment, a confirmation response comprising a global IP address of the local server in response to the query for information identifying the local server received from the user equipment, wherein if a match is found, the processing unit is further adapted to include the global IP address of the local server associated with the base station in the confirmation response,
receive, from the user equipment, a request for the Internet based service, the request comprising the global IP address of the local server,
mirror the connection list from the base station to the local server, and
forward the request for the Internet based service to the local server, for enabling the local server to provide the Internet based service to the user equipment.

8. The base station according to claim 7, wherein the reception of the information identifying the user equipment comprises reception of a Non Access Stratum, NAS, the service request comprising at least one identity of the user equipment.

9. The base station according to claim 7, wherein the reception of the information identifying the user equipment comprises receiving said information from the user equipment performing a handover to the base station.

10. The base station according to claim 7, wherein the reception of the query for information identifying the local server comprises reception of a request for at least one global IP address of at least one local server associated with the base station.

11. The base station according to claim 7, wherein in the event the user equipment is handed over from the base station to a target base station, the processing unit is adapted to:
update the connection list in the base station by removing the information identifying the user equipment,
mirror the connection list from the base station to the local server associated with the base station, for enabling the local server to discover that the user equipment is no longer in the connection list.

12. A local server having a global IP address and being associated with a base station for providing an Internet based service to a user equipment, wherein the local server is capable of delivering the Internet based service, the local server comprising:
a receiving and transmitting unit that enables communication with the user equipment and the local server;
a memory storing instructions to be executed by a processing unit; and
the processing unit, wherein the processing unit is adapted to:
receive a request for an Internet based service from the user equipment via the base station,
receive a connection list being mirrored from the base station to the local server, wherein the connection list comprises information of each of a plurality of user equipments being served by the base station and the global IP address of the local server associated with the base station,
compare an information identifying the user equipment to information in the connection list,
deliver the Internet based service from the local server to the user equipment via the base station in the event the information identifying the user equipment is included in the connection list, and
in the event the information identifying the user equipment is not included in the connection list and the local server is delivering the internet based service to the user equipment, notify an Internet server for enabling the Internet server to trigger the user equipment to discover another potential local server, or for enabling the Internet server to send a list of servers hosting the requested Internet based service.

* * * * *